US012738807B2

(12) United States Patent
Emerson et al.

(10) Patent No.: US 12,738,807 B2
(45) Date of Patent: Sep. 15, 2026

(54) ELECTRIC MOTOR INCLUDING OUTER ROTOR BODY, SURROUNDING COVER, AND FAN INTEGRALLY FORMED WITH THE COVER

(71) Applicant: MILWAUKEE ELECTRIC TOOL CORPORATION, Brookfield, WI (US)

(72) Inventors: Linnea Emerson, Lisbon, WI (US); Brian Trump, Germantown, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 136 days.

(21) Appl. No.: 18/681,228

(22) PCT Filed: Aug. 19, 2022

(86) PCT No.: PCT/US2022/040858

§ 371 (c)(1),
(2) Date: Feb. 5, 2024

(87) PCT Pub. No.: WO2023/023307

PCT Pub. Date: Feb. 23, 2023

(65) Prior Publication Data

US 2024/0313620 A1 Sep. 19, 2024

Related U.S. Application Data

(60) Provisional application No. 63/245,361, filed on Sep. 17, 2021, provisional application No. 63/235,235, filed on Aug. 20, 2021.

(51) Int. Cl.
*H02K 9/06* (2006.01)
*A01G 20/47* (2018.01)
(Continued)

(52) U.S. Cl.
CPC .......... *H02K 9/06* (2013.01); *F04D 25/0613* (2013.01); *F04D 25/064* (2013.01);
(Continued)

(58) Field of Classification Search
CPC ........................................ F04D 25/0613–0646
See application file for complete search history.

(56) References Cited

U.S. PATENT DOCUMENTS 6,170,275 B1 * 1/2001 Ueno ...................... H02K 5/10 416/174
6,362,551 B1 3/2002 Horng
(Continued)

FOREIGN PATENT DOCUMENTS

CN 101035944 A 9/2007
CN 204068492 U 12/2014
(Continued)

OTHER PUBLICATIONS

Japanese Patent Office Action for Application No. 2024-507890 dated Feb. 12, 2025 (12 pages including English translation).
(Continued)

*Primary Examiner* — Laert Dounis
(74) *Attorney, Agent, or Firm* — Michael Best & Friedrich LLP

(57) ABSTRACT

An outer rotor for use with a brushless DC electric motor includes a rotor body, a shaft coupled for co-rotation with the rotor body and defining a rotational axis, a cover surrounding at least a portion of the rotor body, and a fan integrally formed with the cover as a single piece. The fan includes a plurality of blades extending radially outward of the cover and configured to induce an airflow along an exterior surface of the cover in a direction parallel with the rotational axis.

15 Claims, 8 Drawing Sheets

(51) Int. Cl.

| | |
|---|---|
| ***F04D 25/06*** | (2006.01) |
| ***F04D 25/08*** | (2006.01) |
| ***F04D 29/52*** | (2006.01) |
| ***F04D 29/58*** | (2006.01) |
| ***H02K 1/2786*** | (2022.01) |
| ***H02K 7/14*** | (2006.01) |
| ***H02K 21/22*** | (2006.01) |

(52) U.S. Cl.

CPC ........... *F04D 25/082* (2013.01); *F04D 29/52* (2013.01); *F04D 29/5806* (2013.01); *H02K 1/2786* (2013.01); *H02K 7/14* (2013.01); *H02K 21/22* (2013.01); *A01G 20/47* (2018.02)

(56) References Cited

U.S. PATENT DOCUMENTS

| | | | | |
|---|---|---|---|---|
| 6,674,204 | B1 | 1/2004 | Horng et al. | |
| 7,112,906 | B2 | 9/2006 | Chou et al. | |
| 7,350,283 | B2 | 4/2008 | Won et al. | |
| 7,919,893 | B2 | 4/2011 | Horng et al. | |
| 8,137,079 | B2 | 3/2012 | Yamazaki et al. | |
| 8,449,268 | B2 | 5/2013 | Nagamitsu et al. | |
| 8,749,111 | B2 | 6/2014 | Lee | |
| 8,772,993 | B2 | 7/2014 | Strohm et al. | |
| 9,755,479 | B2 | 9/2017 | Jong | |
| 10,056,808 | B2 | 8/2018 | Pozmantir et al. | |
| 10,193,417 | B2 | 1/2019 | Fogle et al. | |
| 10,253,676 | B2 | 4/2019 | Gossling et al. | |
| 10,291,103 | B2 | 5/2019 | Holman | |
| 10,673,295 | B2 | 6/2020 | Looi et al. | |
| 10,693,344 | B2 | 6/2020 | Purohit et al. | |
| 12,060,887 | B2 * | 8/2024 | Keber | F04D 29/701 |
| 2006/0076846 | A1 | 4/2006 | Han | |
| 2007/0090710 | A1 | 4/2007 | Chen | |
| 2007/0132323 | A1 | 6/2007 | Park | |
| 2009/0074594 | A1 * | 3/2009 | Strasser | F01P 5/12 310/114 |
| 2009/0284092 | A1 | 11/2009 | Horng et al. | |
| 2010/0058817 | A1 | 3/2010 | Yoshikawa et al. | |
| 2011/0110798 | A1 | 5/2011 | Tanimoto et al. | |
| 2014/0175912 | A1 | 6/2014 | Germann et al. | |
| 2014/0314596 | A1 * | 10/2014 | Kudo | H02K 7/14 417/420 |
| 2015/0211535 | A1 | 7/2015 | Kodato et al. | |
| 2015/0303753 | A1 | 10/2015 | Huang et al. | |
| 2017/0248145 | A1 | 8/2017 | Chu et al. | |
| 2019/0058373 | A1 | 2/2019 | Fogle et al. | |
| 2019/0136866 | A1 | 5/2019 | Kedelty et al. | |
| 2019/0162192 | A1 | 5/2019 | Gao et al. | |
| 2020/0119620 | A1 | 4/2020 | Suda et al. | |
| 2020/0274421 | A1 | 8/2020 | Purohit et al. | |
| 2020/0276403 | A1 | 9/2020 | Kohanski et al. | |
| 2020/0343780 | A1 | 10/2020 | Fogle et al. | |
| 2020/0343789 | A1 | 10/2020 | Fogle et al. | |
| 2021/0050766 | A1 | 2/2021 | Lee et al. | |

FOREIGN PATENT DOCUMENTS

| | | | | |
|---|---|---|---|---|
| CN | 108155758 | A | 6/2018 | |
| CN | 207588578 | U | 7/2018 | |
| CN | 108880064 | A | 11/2018 | |
| CN | 211239471 | U | 8/2020 | |
| CN | 112054622 | A | 12/2020 | |
| CN | 112117839 | A | 12/2020 | |
| CN | 212343445 | U | 1/2021 | |
| DE | 20308608 | U1 | 8/2003 | |
| JP | 2001244110 | A * | 9/2001 | H02K 9/06 |
| JP | 2020172913 | A | 10/2020 | |

OTHER PUBLICATIONS

International Search Report and Written Opinion for Application No. PCT/US2022/040858 dated Dec. 1, 2022 (10 pages).

* cited by examiner

ELECTRIC MOTOR INCLUDING OUTER ROTOR BODY, SURROUNDING COVER, AND FAN INTEGRALLY FORMED WITH THE COVER

CROSS-REFERENCE TO RELATED APPLICATIONS

This application is a national stage filing under 35 U.S.C. § 371 of International Application No. PCT/US2022/040858 filed on Aug. 19, 2022, which claims priority to U.S. Provisional Patent Application No. 63/245,361, filed on Sep. 17, 2021, and to U.S. Provisional Patent Application No. 63/235,235, filed on Aug. 20, 2021, the entire contents of both of which are incorporated herein by reference.

FIELD OF THE INVENTION

The present invention relates to electric motors, and more particularly to outer rotor brushless DC electric motors.

BACKGROUND OF THE INVENTION

A brushless DC electric motor includes at least a stator and a rotor. A plurality of permanent magnets are supported by the rotor, which receives torque as a result of the interaction between the magnets and magnetic fields created by the stator, causing the rotor to rotate. In some instances, the brushless DC electric motor will include a fan coupled for co-rotation with the rotor.

SUMMARY OF THE INVENTION

The present invention provides, in one aspect, an outer rotor for use with a brushless DC electric motor. The outer rotor includes a rotor body, a shaft coupled for co-rotation with the rotor body and defining a rotational axis, a cover surrounding at least a portion of the rotor body, and a fan integrally formed with the cover as a single piece. The fan includes a plurality of blades extending radially outward of the cover and configured to induce an airflow along an exterior surface of the cover in a direction parallel with the rotational axis.

The present invention provides, in another aspect, a brushless DC electric motor including a stator, and an outer rotor surrounding the stator. The outer rotor includes a rotor body, a shaft coupled for co-rotation with the rotor body, the shaft defining a rotational axis, a cover surrounding at least a portion of the rotor body, and a fan integrally formed with the cover as a single piece. The fan includes a plurality of blades extending radially outward of the cover and configured to induce an airflow along an exterior surface of the cover in a direction parallel with the rotational axis.

The present invention provides, in yet another aspect, a brushless DC electric motor including a stator and an outer rotor surrounding the stator. The outer rotor includes a ring magnet defining a rotational axis, a cover surrounding at least a portion of the ring magnet, and a fan integrally formed with the cover as a single piece. The fan includes a plurality of blades extending radially outward of the cover and configured to induce an airflow along an exterior surface of the cover in a direction parallel with the rotational axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
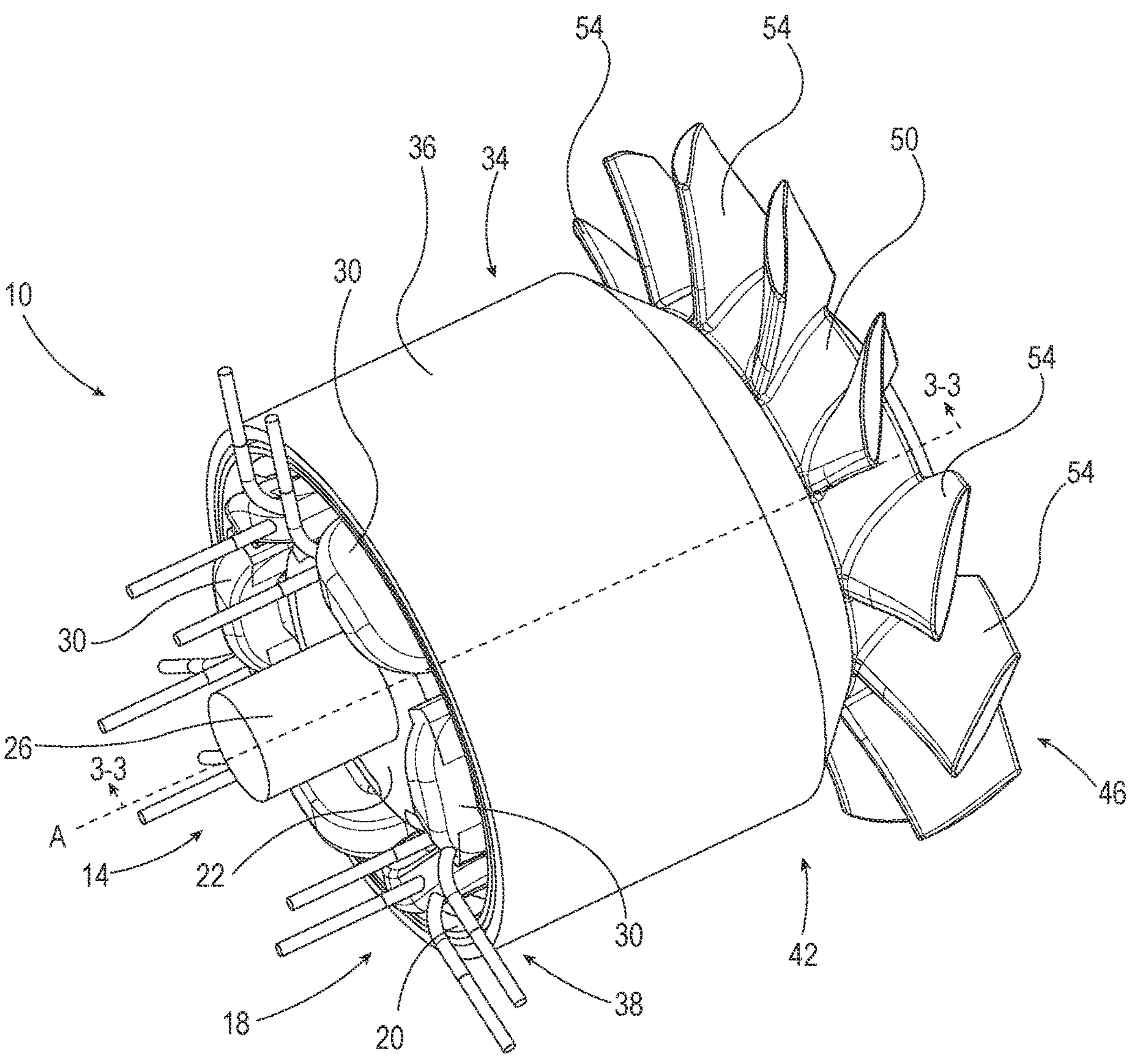
FIG. 1 is a perspective view of a brushless DC electric motor in accordance with an embodiment of the invention.
Figure 2:
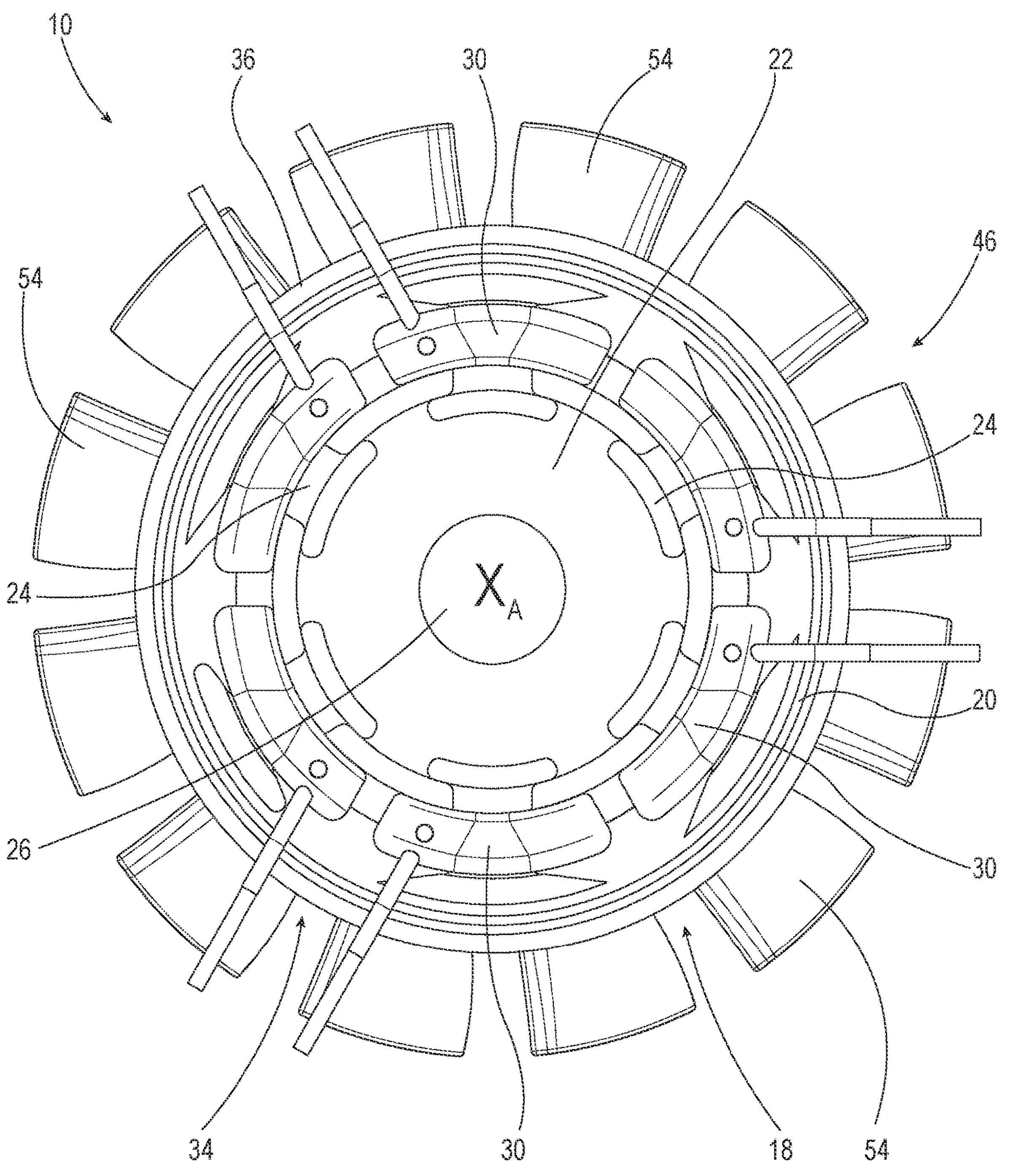
FIG. 2 is a rear view of the electric motor of FIG. 1
Figure 3:
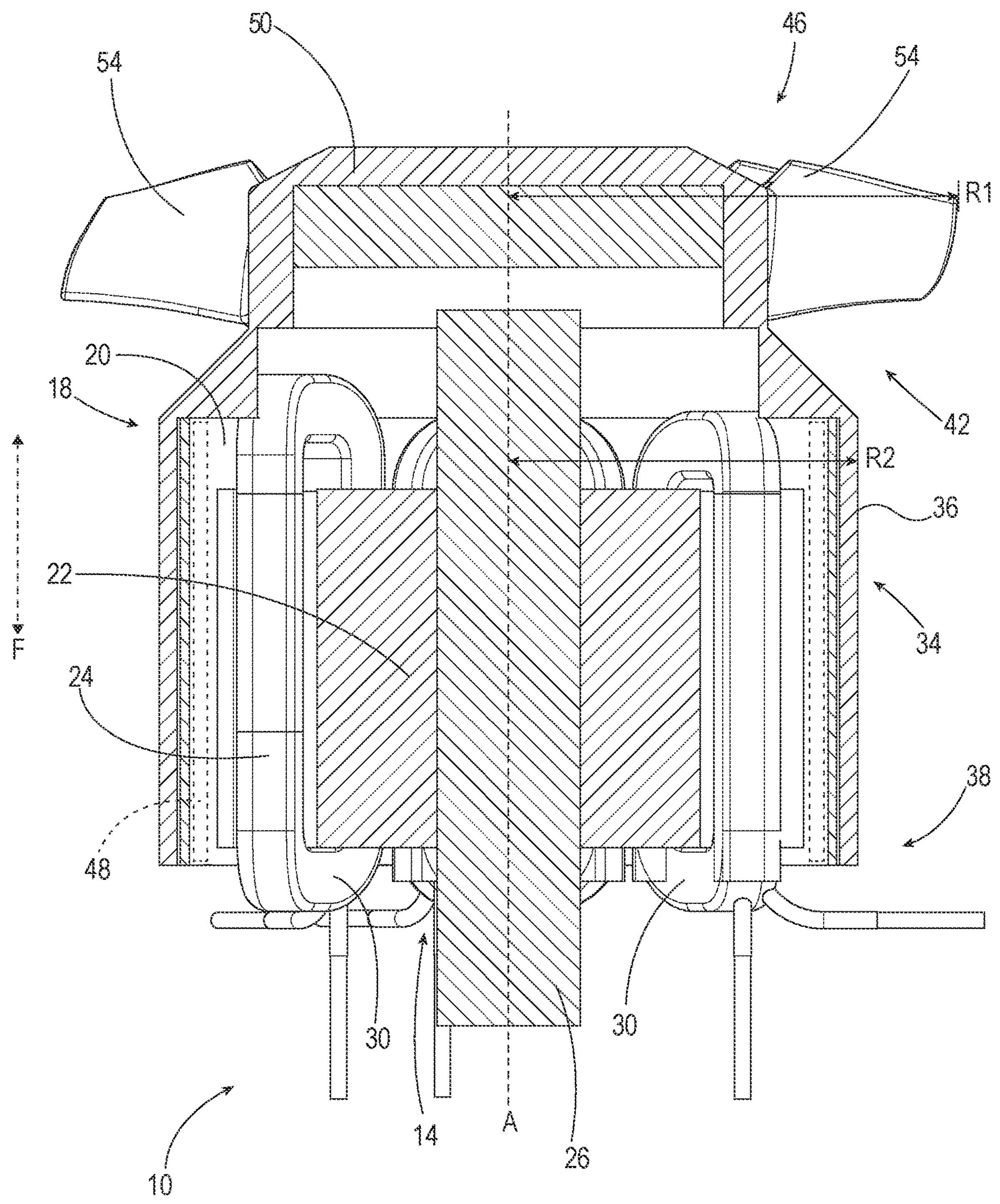
FIG. 3 is a cross-sectional view of the electric motor of FIG. 1 taken along section line 3-3 in FIG. 1.

FIGS. 1-4 illustrate an electric motor 10 according to an embodiment of the invention. The electric motor 10 is a brushless DC (BLDC) electric motor 10 including an internal stator 14 and an external or outer rotor 18. The rotor 18 is supported such that it circumferentially surrounds at least a portion of the stator 14 and extends along a motor axis A. With reference to FIGS. 1-3, the stator 14 includes a stator body 22, which is made from a ferromagnetic material, which is surrounded by the rotor 18. The stator body 22 includes a plurality of radially outward extending fingers 24, and a plurality of windings 30 are wrapped around the respective fingers 24. The outer rotor 18 of the illustrated embodiment is generally cylindrical in shape and extends longitudinally along the motor axis A, such that the outer rotor 18 and the stator 14 are coaxial about the motor axis A.

Figure 6:
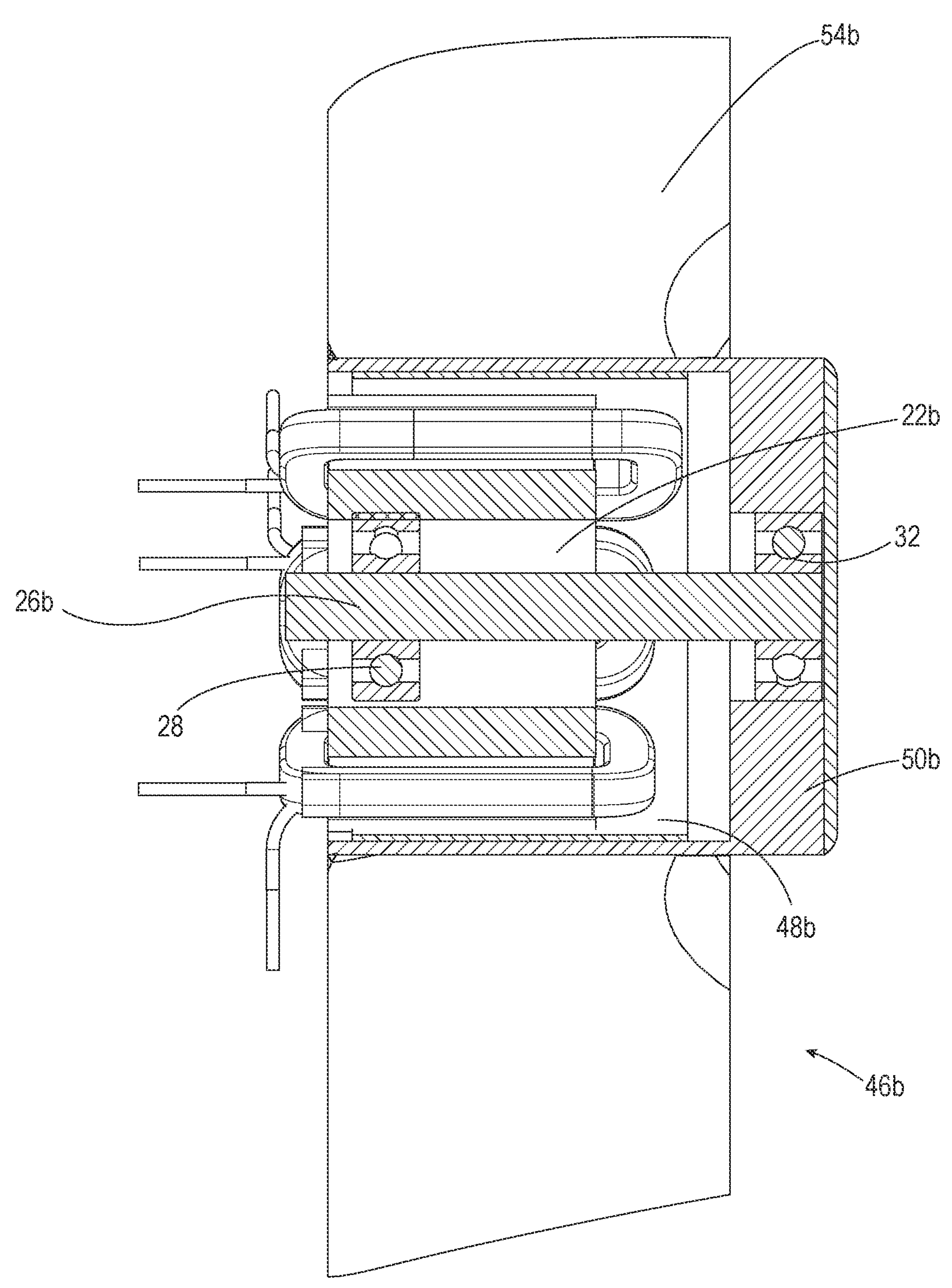
FIG. 6 is a cross-sectional view of the electric motor of FIG. 5 taken along section line 6-6 in FIG. 5.

The rotor 18 includes a rotor body 20 and a shaft 26 coupled for co-rotation with the rotor body 20. The shaft 26 is rotatable about the motor axis A and, in some embodiments, is supported for rotation by the stator 14. For example, the shaft 26 may be supported within the stator body 22 by a first bearing 28 and within the rotor body 20 by a second bearing 32, as shown in FIG. 6. The rotor 18 also includes a ring magnet 48 having a plurality of magnetic poles evenly spaced about the inner circumference of the rotor body 20 in facing relationship with the stator 14. The ring magnet 48 longitudinally extends along the length of the rotor body 20. In some embodiments, the ring magnet 48 may be replaced with a plurality of separate permanent magnets having a rectangular cross-sectional shape in a plane oriented perpendicular to the motor axis A.

With continued reference to FIGS. 1-3, the rotor 18 further includes a plastic cover 34 surrounding the rotor body 20. The cover 34 longitudinally extends along the length of the rotor 18 and includes a first open end 38 and a second closed end 42. The rotor 18 also includes an axial-flow fan 46 located at the closed end 42 of the cover 34. The plastic cover 34 and fan 46 are secured to the rotor 18 for co-rotation therewith, such that rotation of the outer rotor 18 results in rotation of the fan 46, which in turn induces an axial airflow F along an exterior surface 36 of the cover 34 in a direction parallel with the motor axis A. In other embodiments of the motor 10, the fan 46 may be configured as a radial-flow fan or as a centrifugal fan capable of inducing an axial airflow in a direction parallel with the motor axis A and redirecting the airflow in a radially outward direction.

Figure 4:
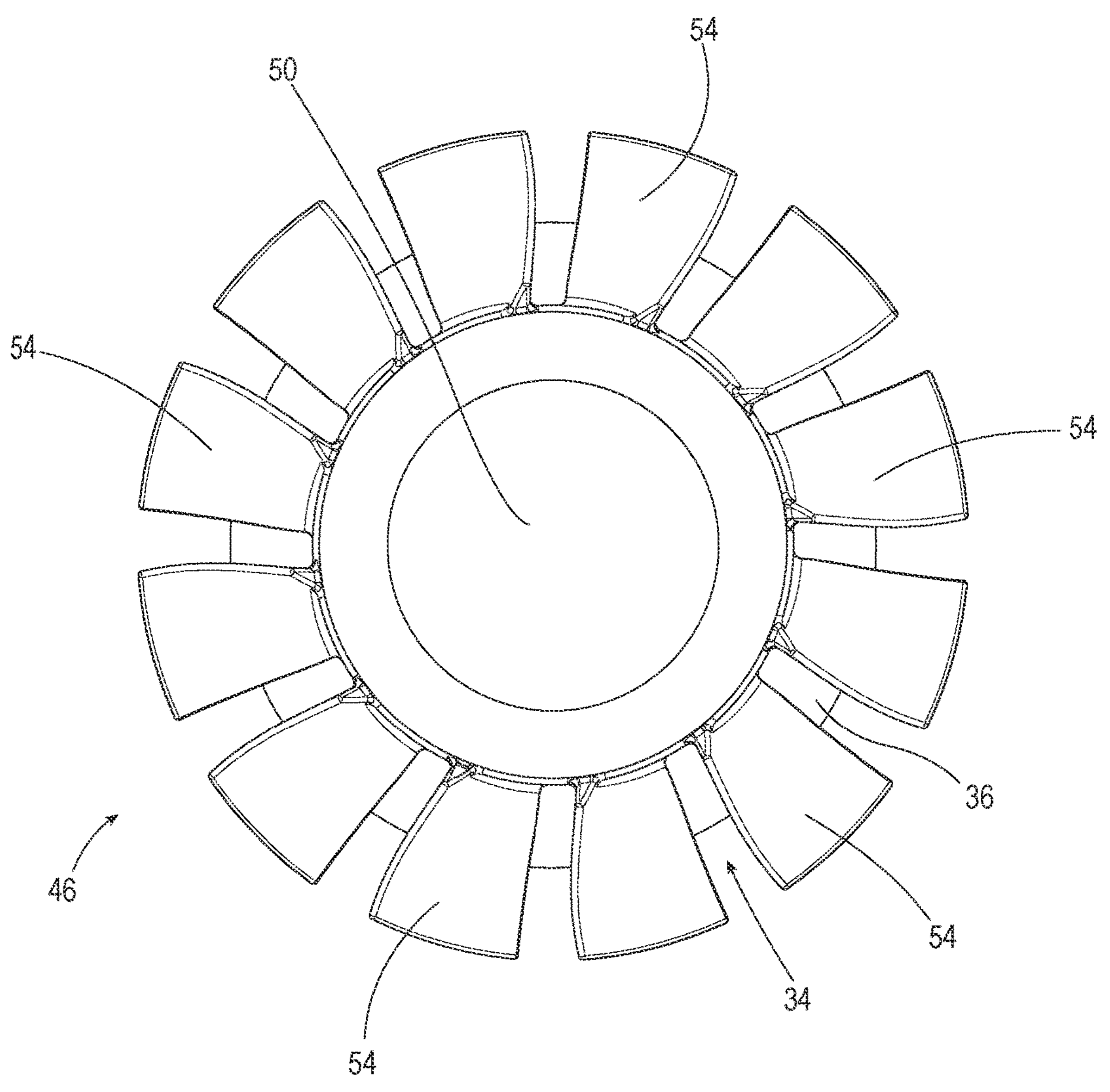
FIG. 4 is a front view of the electric motor of FIG. 1.

With reference to FIGS. 3 and 4, the fan 46 includes a central hub 50 coupled to the cover 34 and a plurality of blades 54 extending radially outward from the hub 50 (i.e., in a direction perpendicular to the motor axis A) beyond the exterior surface 36 of the cover 34. In the illustrated embodiment of the motor 10, the tips of the fan blades 54 extend to a radius R1 that is greater than a radius R2 of the cover 34 (relative to the motor axis A). In some embodiments, the radius R1 is at least 1.1 times the radius R2. In other embodiments, the radius R1 is at least 1.3 times the radius R2. The hub 50 is integrally formed with both the fan 46 and the cover 34. In other words, the cover 34, the hub 50, and the fan 46 are formed as a single, monolithic component.

Referring again to FIGS. 3 and 4, the plastic cover 34 is coupled to the rotor body 20 for co-rotation therewith. In the illustrated embodiment, the cover 34 is overmolded onto an outer surface of the rotor body 20. The fan 46 is also integrally formed during the process of overmolding the cover 34 to the outer surface of the rotor body 20. In some embodiments, during the overmolding process, the shaft 26 is also overmolded by a portion of the central hub 50, thereby rotationally unitizing the shaft 26 to the rotor body 20 (via the central hub 50 and cover 34). The ring magnet 48 may be press-fit within the cover 34 after the cover 34 is molded.

Figure 5:
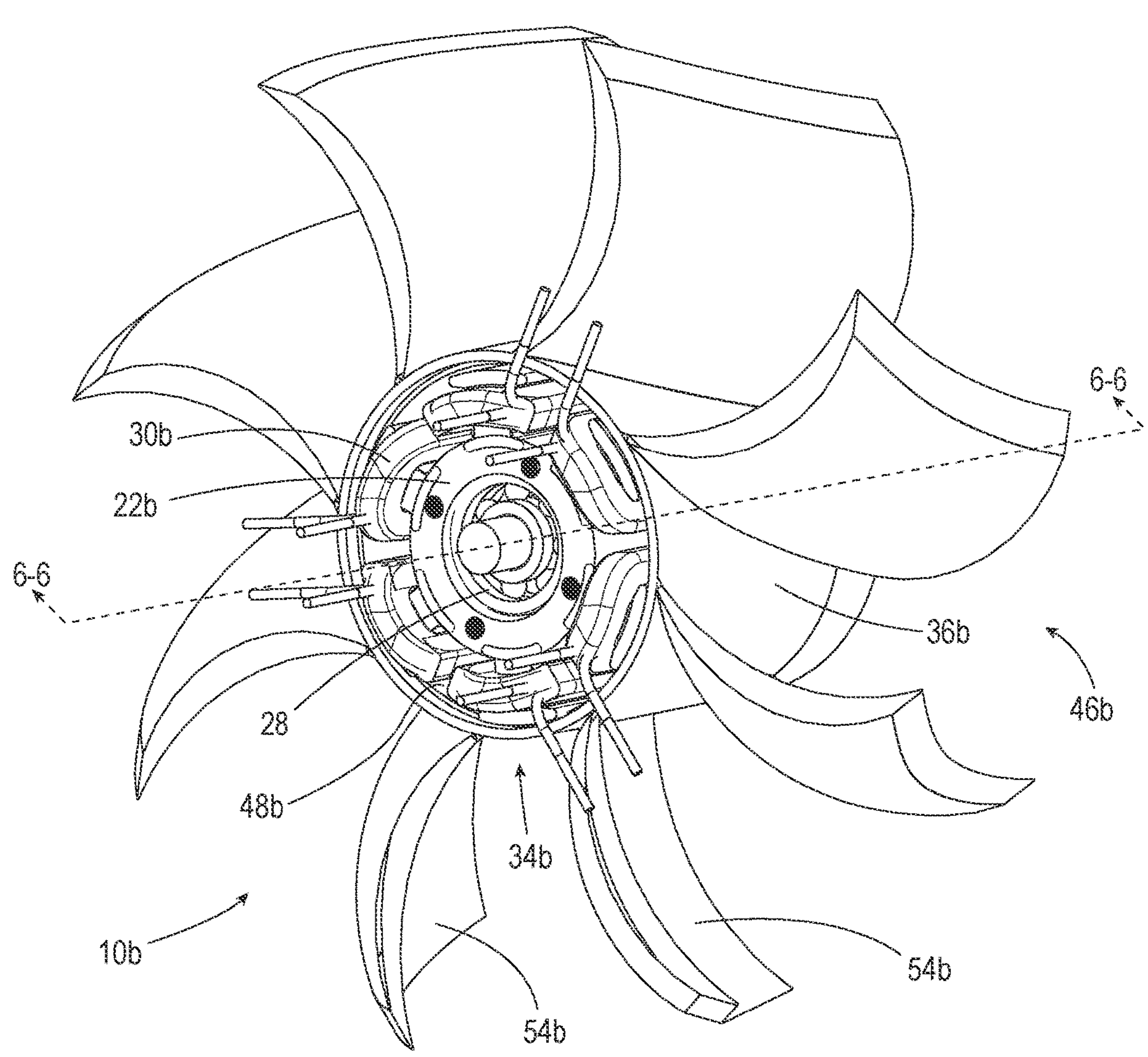
FIG. 5 is a perspective view of a brushless DC electric motor in accordance with another embodiment of the invention.

FIGS. 5-6 illustrate another embodiment of the fan 46, with like components having like reference numerals plus the letter "b," and the following differences explained below: Rather than including a separate rotor body 20 like the fan 46, the fan 46*b* includes a ring magnet 48*b* press-fit within the cover 34*b* after the fan 46*b* has been formed (e.g., by an injection molding process). Also, the plurality of fan blades 54*b* do not extend from the hub 50*b*, but rather extend radially outward (i.e., in a direction perpendicular to the motor axis A) from the exterior surface 36*b* of the cover 34*b*, and, in the illustrated embodiment, each of the plurality of fan blades 54 extends the length of the cover 34*b*.

Figure 7:
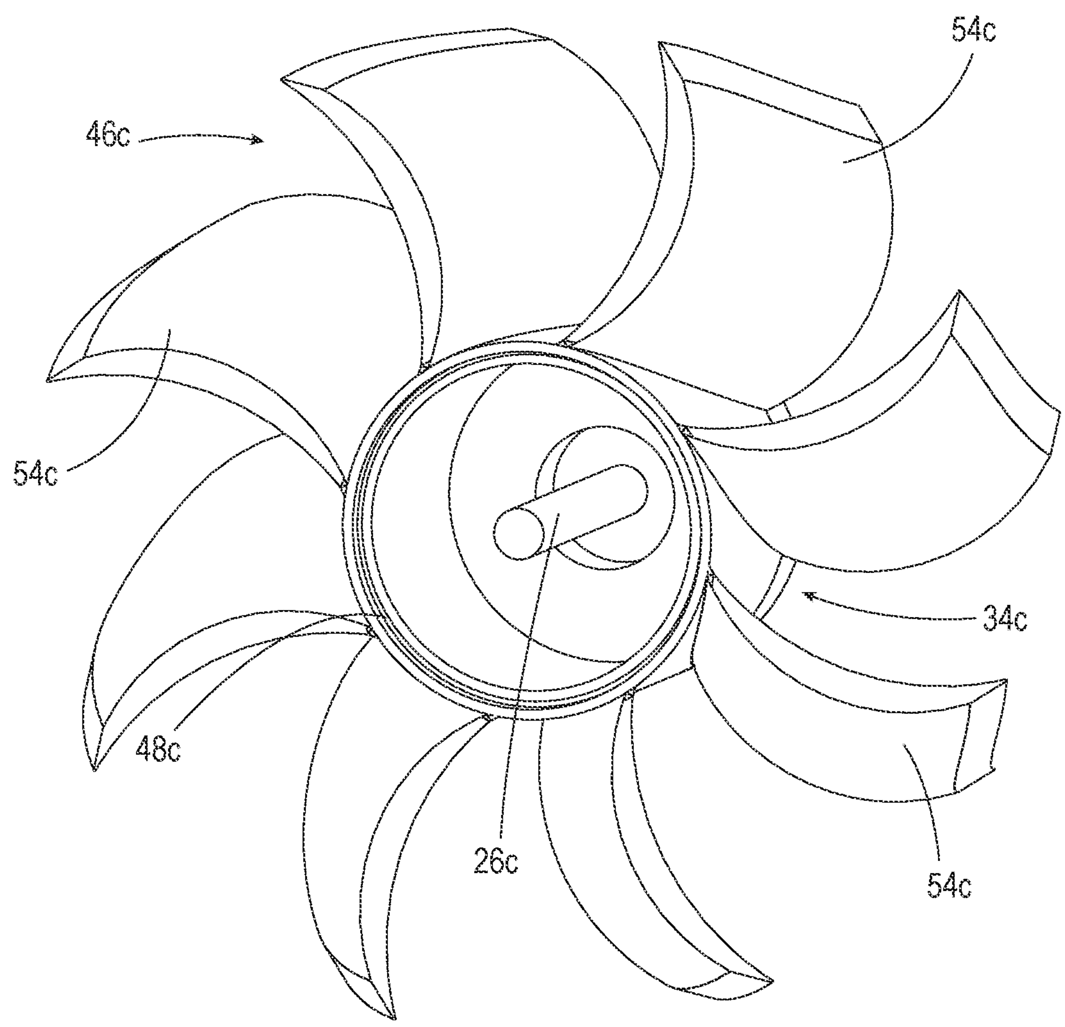
FIG. 7 is a perspective view of an alternative embodiment of a fan for use with the motor of FIG. 5.

FIG. 7 illustrates another embodiment of the fan 46, 46*b*, with like components having like reference numerals plus the letter "c," and the following differences explained below. Rather than press-fitting the ring magnet 48*c* into the cover 34*c* in a post-manufacturing assembly process, the ring magnet 48*c* is overmolded by the cover 34*c* during the injection molding process to create the fan 46*c*. In the embodiment of FIG. 7, the rotor body 20 is also omitted.

In operation of the electric motor 10 (or the motor 10*b*, with the fan 46*b* or fan 46*c*), the cover 34 and fan 46 co-rotate with the rotor body 20 as a result of being rotationally unitized to the rotor body 20 during the process of overmolding the cover 34 and fan 46 to the rotor body 20. The fan blades 54 induce an axial airflow F around the exterior surface 36 of the cover 34 to cool the motor 10 and other electronics associated with the motor 10 within the path of the cooling airflow. In some applications in which the motor 10 may be used, the airflow induced by the fan 46 can be used for other purposes besides cooling. For example, the induced airflow may be used for transporting debris or particles in a rotary hammer dust extractor or a vacuum.

Figure 8:
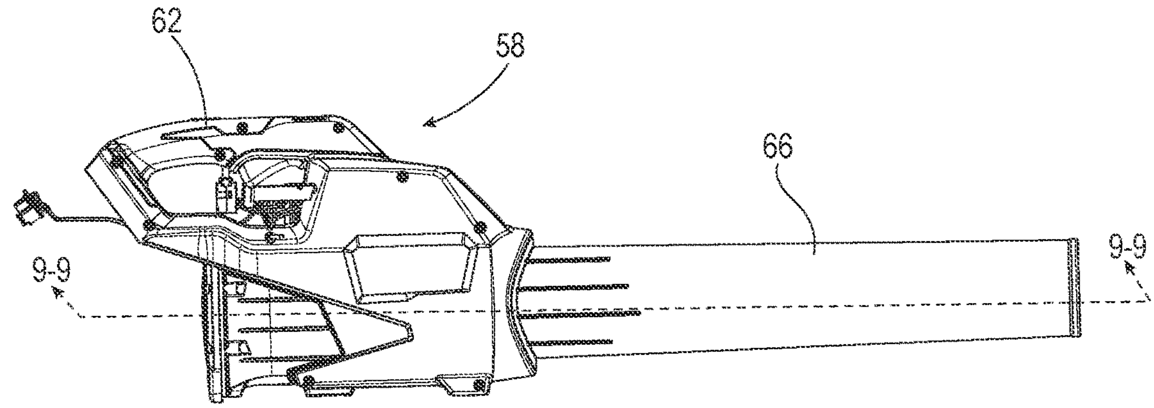
FIG. 8 is a side view of a power tool that utilizes the electric motor of FIG. 1 or 5.
Figure 9:
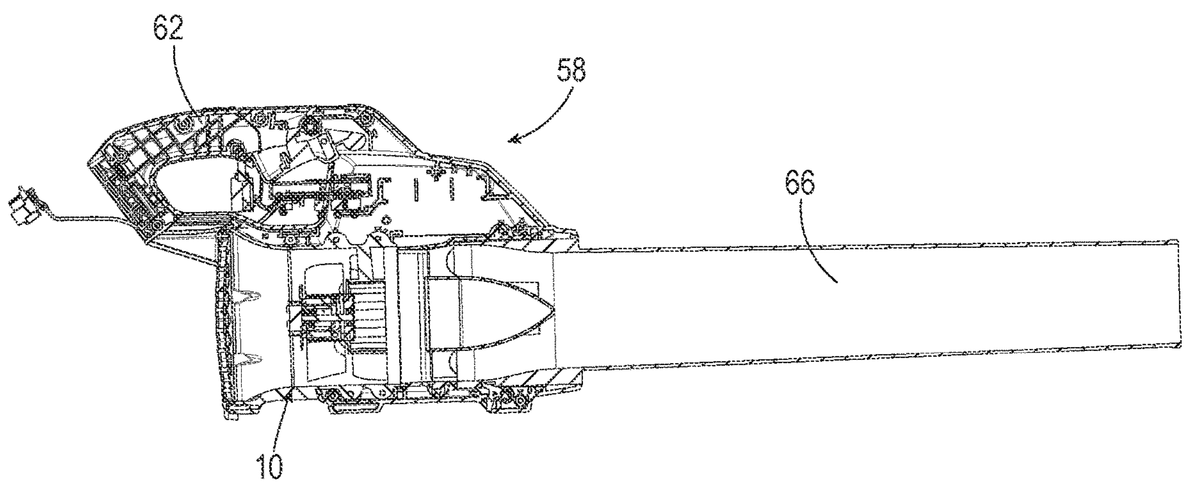
FIG. 9 is a cross-sectional view of the power tool of FIG. 8 taken along section line 9-9 in FIG. 8.

Also, the motor 10 may be used in a blower, which discharges the airflow from a nozzle to disperse debris from a work surface. As shown in FIGS. 8-9, a blower includes a housing 58 in which the motor 10 is located. The housing 58 includes a handle 62 and a longitudinally extending nozzle 66 through which high-speed airflow generated by the motor 10 is directed. In operation, the fan 46 creates a high-speed airflow as a result of being rotationally unitized to the rotor body 20 of the electric motor 10. The high-speed airflow serves cool the electric motor 10 and as the airflow that is discharged from the nozzle 66 of the blower.

Although the invention has been described in detail with reference to certain preferred embodiments, variations and modifications exist within the scope and spirit of one or more independent aspects of the invention as described.

Various features and aspects of the present invention are set forth in the following claims.

What is claimed is:

1. An outer rotor for use with a brushless DC electric motor, the outer rotor comprising:

a rotor body;

a shaft coupled for co-rotation with the rotor body, the shaft defining a rotational axis;

a cover surrounding at least a portion of the rotor body; and a fan positioned at an axial end of and integrally formed with the cover as a single piece, the fan including a central hub adjacent the axial end of the cover, the central hub including a cylindrical outer peripheral surface and a plurality of blades extending radially outward from the cylindrical outer peripheral surface of the central hub, the blades configured to induce an airflow in a direction parallel with the rotational axis, wherein the cover has a first radius, wherein the cylindrical outer peripheral surface has a second radius, and wherein the second radius is smaller than the first radius.

2. The outer rotor of claim 1, wherein each of the blades extends farther from the rotational axis than the cover.

3. The outer rotor of claim 1, wherein the cover and the fan are formed from plastic.

4. The outer rotor of claim 1, further comprising a magnet positioned on an interior surface of the rotor body, and wherein the magnet is coupled for co-rotation with the rotor body and the cover.

5. The outer rotor of claim 1, wherein the cover is overmolded onto the rotor body.

6. The outer rotor of claim 5, wherein the cover extends a length of the rotor body.

7. A brushless DC electric motor comprising:

a stator; and an outer rotor surrounding the stator, the outer rotor including a rotor body, a shaft coupled for co-rotation with the rotor body, the shaft defining a rotational axis, a cover surrounding at least a portion of the rotor body, and a fan positioned at an axial end of and integrally formed with the cover as a single piece, the fan including a central hub in front of the axial end of the cover and the rotor body, the central hub including a cylindrical outer peripheral surface and a plurality of blades extending radially outward from the cylindrical outer peripheral surface of the central hub, the blades configured to induce an airflow flowing from the fan to the cover in a direction parallel with the rotational axis.

8. The brushless DC electric motor of claim 7, wherein each of the blades extends farther from the rotational axis than the cover.

9. The brushless DC electric motor of claim 7, wherein the cover is overmolded onto the rotor body.

10. The brushless DC electric motor of claim 7, wherein the rotor body is press-fit within the cover.

11. The brushless DC electric motor of claim 7, wherein the fan is configured as an axial-flow fan.

12. A brushless DC electric motor comprising:

a stator; and an outer rotor surrounding the stator, the outer rotor including a ring magnet defining a rotational axis, a cover surrounding at least a portion of the ring magnet, and a fan positioned at an axial end of and integrally formed with the cover as a single piece, the fan including a central hub adjacent the axial end of the cover, the central hub including a cylindrical outer peripheral surface and a plurality of blades extending radially outward from the cylindrical outer peripheral surface of the central hub, the blades configured to induce an airflow flowing from the fan to the cover in a direction parallel with the rotational axis, wherein the cover has a first radius, wherein the cylindrical outer peripheral surface has a second radius, and wherein the second radius is smaller than the first radius.

13. The brushless DC electric motor of claim 12, wherein the cover is overmolded onto the ring magnet.

14. The brushless DC electric motor of claim 12, wherein the ring magnet is press-fit within the cover.

15. The brushless DC electric motor of claim 12, wherein the fan is configured as an axial-flow fan.

* * * * *